Aug. 26, 1969     H. PYPTIUK     3,463,421
JET-PROPELLED AEROPLANES
Filed July 19, 1967     2 Sheets-Sheet 1
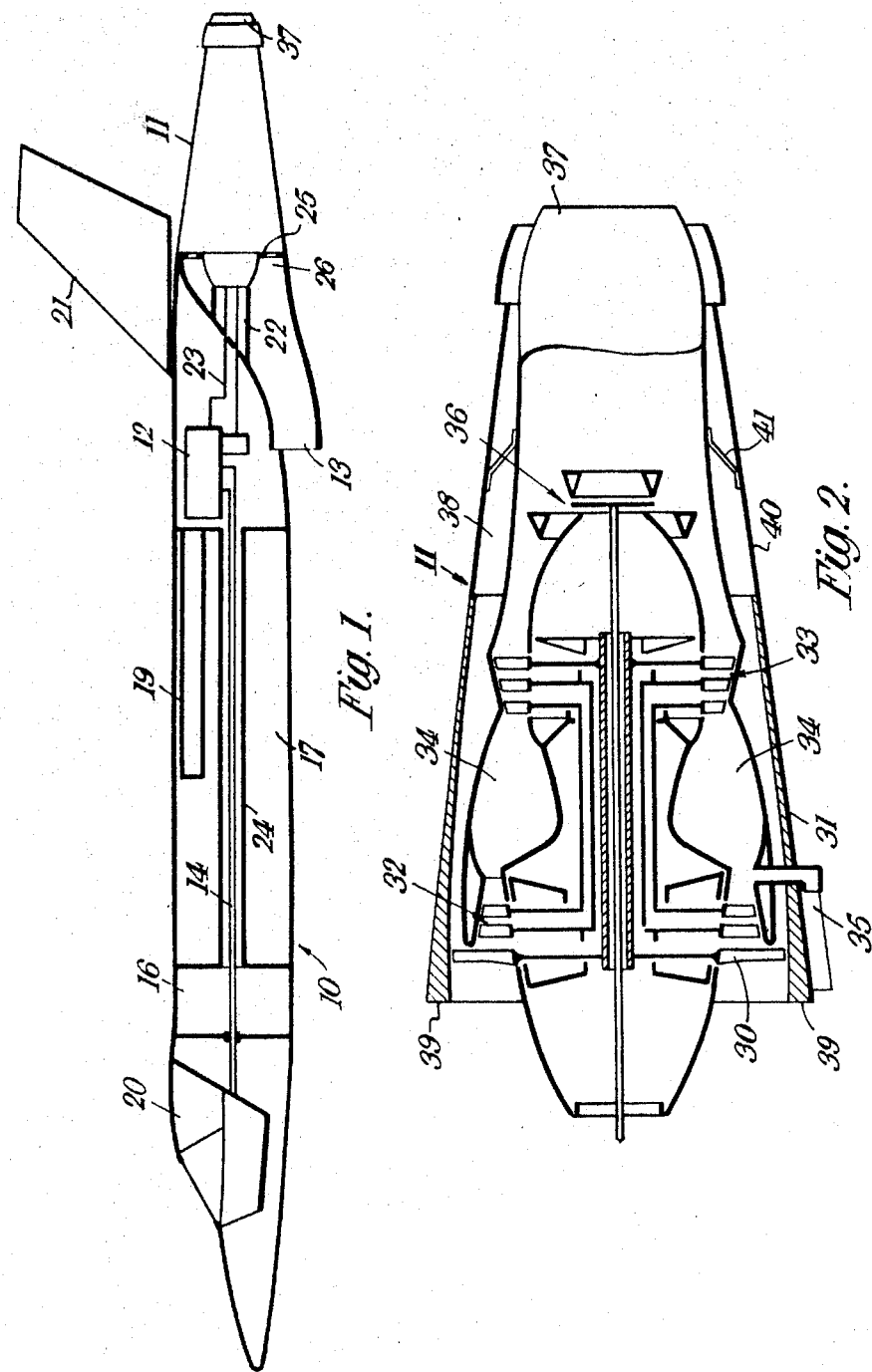
INVENTOR
HENRYK PYPTIUK
BY
Nolte & Nolte
ATTORNEYS Aug. 26, 1969　　　H. PYPTIUK　　　3,463,421
JET-PROPELLED AEROPLANES
Filed July 19, 1967　　　　　　　　　　　　　2 Sheets-Sheet 2
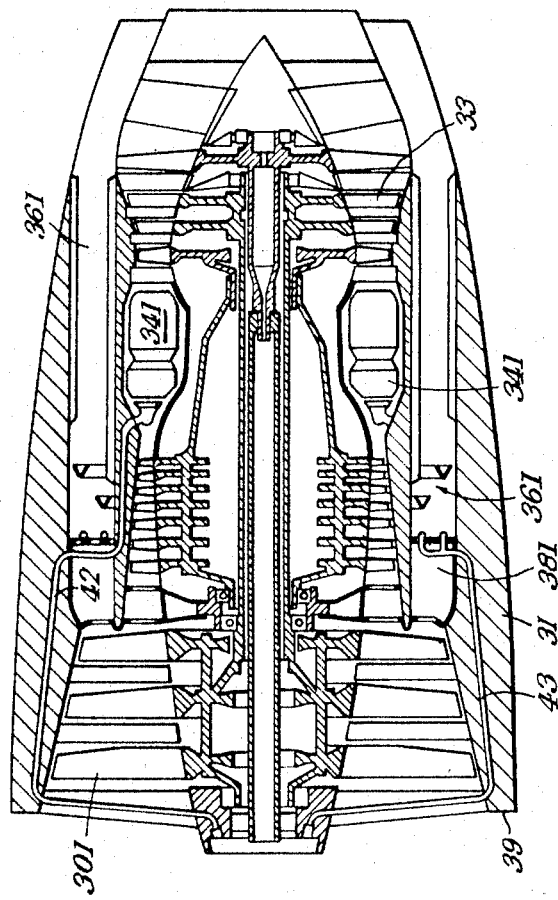
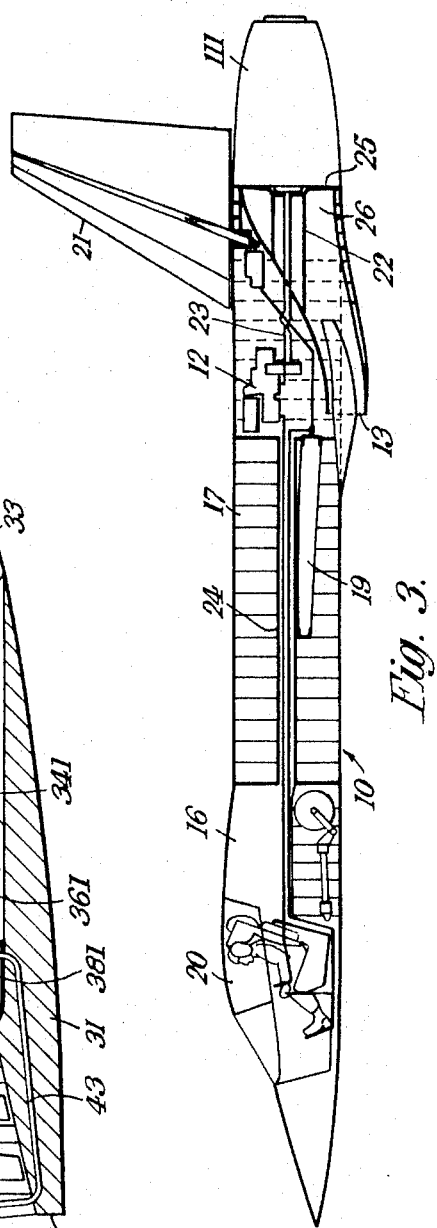
INVENTOR
HENRYK PYPTIUK
BY
Nolte & Nolte
ATTORNEYS 3,463,421
JET-PROPELLED AEROPLANES
Henryk Pyptiuk, Preston, England, assignor to British Aircraft Corporation Limited, London, England, a British company
Filed July 19, 1967, Ser. No. 657,464
Claims priority, application Great Britain, July 27, 1966, 33,812/66
Int. Cl. B64c *1/16;* F02k *3/00*
U.S. Cl. 244—54                                                8 Claims

ABSTRACT OF THE DISCLOSURE

A jet-propelled aeroplane having a tail mounted gas turbine engine in which the engine outer shell forms a structural element of the fuselage, supporting and transmitting to the fuselage the engine thrust and weight and other loads while constituting a continuation of the fuselage surface. The shell is formed with a leading flange, or mounting ring for attaching it in cantilever to a bulkhead at the end of the fuselage.

---

The invention is concerned with jet-propelled aeroplanes in which a gas turbine propulsion engine is disposed at the tail of a fuselage, the engine comprising an outer shell of substantially circular cross-section with its longitudinal axis substantially aligned with that of the fuselage. The object of the invention is to provide an improved form of aeroplane of this kind, possessing a high structural efficiency and certain other advantages as hereinafter described.

According to the invention, in a jet-propelled aeroplane of the aforesaid kind, the engine outer shell forms a structural element of the fuselage, being adapted to support and transmit to the fuselage the engine thrust and weight and other loads imposed on the shell whilst the outer surface of the shell is in aerodynamic continuity with the wetted surface of the fuselage envelope. Where used in this specification, the expression "engine outer shell" is to be understood to mean the outermost casing enclosing the engine, i.e. in a pure turbo-jet engine it consists of the casing of the compressor, combustion zone and turbine, and in a by-pass or turbo-fan engine it forms the annular outer wall of the by-pass duct.

The external shape of the engine outer shell conforms to the desired configuration of the fuselage. The shell may be provided with a leading flange or mounting ring for its attachment in cantilever-fashion at the after extremity of the fuselage.

The engine auxiliary equipment which is conventionally housed outside the engine casing is accommodated in a compartment of the fuselage forward of the engine, in order to avoid encroachment upon the space available inside the shell for the engine. It will thus be seen that the cross-sectional dimension of the fuselage at the engine compartment is governed solely by the engine dimension, whereby it is possible to effect a substantial economy in the size of the fuselage, resulting in valuable reductions in the cross-sectional and wetted areas thereof, with corresponding savings in fuel, aircraft weight, and engine power requirements.

Two embodiments of the invention will now be described in more detail by way of example and with reference to the accompanying diagrammatic drawings, in which:

FIG. 1 is a longitudinal sectional view of an aeroplane and power-plant arrangement representing one embodiment of the invention, FIG. 2 is a sectional view of the engine alone, drawn to a larger scale, FIG. 3 is a view similar to FIG. 1 of a second embodiment, and FIG. 4 is a sectional view of the engine employed in the second embodiment.

It will be seen from the drawings that the aeroplane has a fuselage 10, a gas turbine engine 11 mounted at the tail, an air-intake 13, a pilot's cockpit 20 and a fin 21. The wing spar box is shown at 19.

A compartment 12, forward of the engine, accommodates auxiliary engine equipment such as fuel pumps, metering apparatus and cabin pressurisation apparatus, which are conventionally housed outside the engine casing. Fuel lines, engine controls and other communications 23 between the engine and such auxiliary equipment are passed through a tunnel 22 in the air intake duct 26.

The central part 17 of the fuselage forms a fuel tank. Through its centre extends a tunnel 24 housing an air supply 15 for the cockpit pressurisation system and the engine operating controls 14. An equipment bay 16 is provided between the cockpit 20 and the tank 17.

Reference to FIG. 2 shows that the engine is of the turbo-fan type, having a front fan 30 and compressor stages 32 driven by a turbine 33, the combustion zone being indicated at 34. The efflux from the front fan 30 is divided between the intake of compressor 32 (the primary gas flow) and a by-pass duct 38 (the secondary gas flow). The shell 31 forms the annular outer wall of the by-pass duct 38. The numeral 35 denotes an air tap for de-icing and cabin pressurisation purposes. Re-heat equipment is illustrated at 36 downstream of the turbine 33, i.e. in the primary gas flow.

The engine has a load-carrying outer shell 31 of circular cross-section, the forward part of which is thickened to form a flange or mounting ring for attachment to the rear of the bulkhead 25 of the fuselage, shown in FIG. 1. The forward face 39 of the shell 31 mates with the rear face of the bulkhead 25, through which the air intake duct 26 passes. A jet pipe and nozzle 37 are supported in cantiliver manner through a conical shell 40 at brackets 41 from the after end of the shell 31.

The embodiment of FIGS. 3 and 4 differs from that of FIGS. 1 and 2 chiefly in the use of an alternative form of engine 111 of shorter overall length. This shortening is effected by repositioning the re-heat equipment 361 in the by-pass duct 381, i.e. in the secondary gas flow. The engine also differs in having a three-stage front fan 301. Fuel feed passages to the main combustion chambers 341 and to the re-heat equipment 361 are indicated at 42 and 43, respectively.

As before, the engine has a load-carrying outer shell 31 of the circular cross-section, the forward part of which forms a flange or mounting ring for attachment to the rear of the fuselage bulkhead 25, the forward face 39 of the shell 31 mating with the rear face of the bulkhead 25.

In both embodiments, the engine outer shell 31 conforms externally to the shape and contour of the fuselage envelope, and its constructional form is sufficiently sturdy to enable it to perform the load-bearing duties of a structural element of the fuselage, i.e. it supports the weight of the engine and the thrust generated thereby and other loads imposed on it, e.g. by aerobatic or other maneuvers, and transmits such loads to the main fuselage structure. Due to the fact that it is required to house only the engine itself, the auxiliary equipment being stowed in the compartment 12, it is possible to restrict the fuselage cross-sectional dimension to a value not greatly exceeding the engine diameter.

Other advantages accruing to the arrangement in accordance with the invention are:

(a) Increased safety due to localization of damage by failure of a rotary component of the engine, (b) Reduced fire hazard, and (c) Improved accessibility for removal or replacement of components.

What I claim as my invention and desire to secure by Letters Patent is:

1. A jet-propelled aeroplane having a fuselage and a gas turbine propulsion engine disposed in the tail of said fuselage, said engine having an outer shell of substantially circular cross-section with its longitudinal axis substantially aligned with that of the fuselage, said outer shell being provided with a leading flange by means of which it is attached in cantilever-fashion to said fuselage, said outer shell being a structural element of said fuselage whereby the engine weight, thrust and other loads imposed on the shell are transmitted to the fuselage, and the outer surface of said engine shell being in aerodynamic continuity with the wetted surface of the fuselage envelope.

2. A jet-propelled aeroplane having a fuselage and a gas turbine propulsion engine disposed in the tail of said fuselage, said engine having an outer shell of substantially circular cross-section with its longitudinal axis substantially aligned with that of the fuselage, said outer shell being provided with a leading flange by means of which it is attached in cantilever-fashion to said fuselage whereby the engine weight, thrust and other loads imposed on the shell are transmitted to the fuselage, the shell further having an outer surface forming a direct rearward continuation of the wetted surface of the fuselage.

3. An aeroplane according to claim 2, having a compartment in the fuselage forward of the engine, wherein the engine auxiliary equipment is accommodated.

4. An aeroplane according to claim 2, wherein the central part of the fuselage forms a fuel tank.

5. An aeroplane according to claim 4, further comprising a pilot's cockpit disposed in the nose of the fuselage, a tunnel in said fuel tank, and controls for the engine passing through the tunnel in said fuel tank.

6. An aeroplane according to claim 5, further comprising an equipment bay being provided between said cockpit and said fuel tank.

7. An aeroplane according to claim 2 wherein said fuselage is provided with a bulkhead and said leading flange is attached to said bulkhead, and an air intake duct passing through the said bulkhead.

8. An aeroplane according to claim 7, further comprising fuel lines and engine controls in such fuselage, and said fuel lines and engine controls pass through said air intake duct.

References Cited

UNITED STATES PATENTS

| | | | |
|---|---|---|---|
| 2,477,637 | 8/1949 | Mercier | 244—53 X |
| 2,676,773 | 4/1954 | Sanz et al. | 244—135 |
| 3,132,827 | 5/1964 | Roy et al. | 60—226 X |
| 3,194,516 | 7/1965 | Messerschmitt | 60—224 X |

MILTON BUCHLER, Primary Examiner

JAMES E. PITTENGER, Assistant Examiner

U.S. Cl. X.R.

60—39.31, 226